(12) United States Patent
Hooper (10) Patent No.: US 11,349,954 B2
(45) Date of Patent: *May 31, 2022

(54) MEDIA TRANSCODING BASED ON PRIORITY OF MEDIA

(71) Applicant: DIRECTV, LLC, El Segundo, CA (US)

(72) Inventor: Anthony Hooper, Toronto (CA)

(73) Assignee: DIRECTV, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,550

(22) Filed: Aug. 31, 2020

(65) Prior Publication Data
US 2020/0396313 A1    Dec. 17, 2020

Related U.S. Application Data

(63) Continuation of application No. 15/845,471, filed on Dec. 18, 2017, now Pat. No. 10,764,396.

(51) Int. Cl.
*H04L 67/62* (2022.01)
*H04L 67/61* (2022.01)
(Continued)

(52) U.S. Cl.
CPC .......... *H04L 67/325* (2013.01); *H04L 67/288* (2013.01); *H04L 67/2823* (2013.01);
(Continued)

(58) Field of Classification Search
CPC . H04L 67/325; H04L 67/2823; H04L 67/288; H04L 67/2895; H04L 67/322; H04N 21/234309
See application file for complete search history.

(56) References Cited

U.S. PATENT DOCUMENTS 6,275,536 B1    8/2001 Chen et al.
6,345,279 B1    2/2002 Li et al.
(Continued)

FOREIGN PATENT DOCUMENTS

| KR | 101569502 B1 | 11/2015 |
| WO | WO 2015051755 A1 | 4/2015 |
| WO | WO 2015096745 A1 | 7/2015 |

OTHER PUBLICATIONS

Berhe et al., "Content Adaptation in distributed multimedia system", Journal of Digital Information Management vol. 3 No. 2 (Jun. 2005). pp. 95-100. http://www.dirf.org/jdim/v3n208.pdf.
(Continued)

*Primary Examiner* — Nasser M Goodarzi
*Assistant Examiner* — Adil Ocak
(74) *Attorney, Agent, or Firm* — Hanley, Flight & Zimmerman, LLC (57) ABSTRACT

In one example, the present disclosure describes a device, computer-readable medium, and method for transcoding digital media in an optimized manner based on media priority. For instance, in one example, a method includes obtaining a plurality of media content items awaiting transcoding before being distributed over a content distribution network, identifying a plurality of transcoding resources available to transcode the plurality of media items, and generating a schedule for transcoding the plurality of media content items using the plurality of transcoding resources, wherein the schedule prioritizes those media content items of the plurality of media content items that have the highest relative business value.

20 Claims, 5 Drawing Sheets

(51) Int. Cl.
*H04L 67/288* (2022.01)
*H04L 67/2895* (2022.01)
*H04L 67/565* (2022.01)
*H04N 21/2343* (2011.01)

(52) U.S. Cl.
CPC ........ *H04L 67/2895* (2013.01); *H04L 67/322* (2013.01); *H04N 21/234309* (2013.01)

(56) References Cited

U.S. PATENT DOCUMENTS

| | | |
|---|---|---|
| 6,477,180 B1 | 11/2002 | Aggarwal et al. |
| 6,954,432 B1 | 10/2005 | Bychowsky et al. |
| 7,475,106 B2 | 1/2009 | Agnoli et al. |
| 7,634,002 B2 | 12/2009 | Mukherjee et al. |
| 7,676,590 B2 | 3/2010 | Silverman et al. |
| 8,380,864 B2 | 2/2013 | Bowra et al. |
| 8,583,828 B2 | 11/2013 | Chen |
| 8,688,859 B2 | 4/2014 | Vecchio et al. |
| 8,782,281 B2 | 7/2014 | Mail et al. |
| 8,855,189 B1 | 10/2014 | Krause et al. |
| 8,862,733 B2 | 10/2014 | Lemus et al. |
| 8,868,785 B1 | 10/2014 | Umapathy et al. |
| 9,237,188 B1 | 1/2016 | Gabrielson et al. |
| 10,764,396 B2 | 9/2020 | Hooper |
| 2003/0233464 A1 | 12/2003 | Walpole et al. |
| 2004/0258063 A1 | 12/2004 | Raith et al. |
| 2006/0198392 A1 | 9/2006 | Park et al. |
| 2009/0172685 A1 | 7/2009 | Shavit |
| 2011/0138429 A1 | 6/2011 | Schade et al. |
| 2012/0182865 A1 | 7/2012 | Andersen et al. |
| 2014/0321835 A1 | 10/2014 | Straub et al. |
| 2014/0344398 A1 | 11/2014 | Cassidy et al. |
| 2017/0222987 A1 | 8/2017 | Krieger et al. |
| 2018/0131979 A1 | 5/2018 | Bayoumi et al. |

OTHER PUBLICATIONS

Hsiao et al., "Versatile transcoding proxy for internet content adaptation", IEEE Transactions on Multimedia vol. 10 Issue 4 (Jun. 2008). pp. 646-658. https://pdfs.semanticscholar.org/6abe/4c3dad5b23da13046e1d4cdb17df22083dd6.pdf.

Bellini et al., "An architecture of automating production of cross media content for multi-channel distribution", Proceedings of the First International Conference on Automated Production of Cross Media Content for Multi-Channel Distribution (AXMEDIS'05). IEEE (2005). 12 Pages. https://www.researchgate.net/profile/Paolo_Nesi2/publication/4221266_An_architecture_of_automating_production_of_cross_media_content_for_multi--channel_distribution/links/09e4150fecc92acbde000000.pdf.

Lum et al., "On balancing between transcoding overhead and spatial consumption in content adaptation", Proceedings of the 8th annual international conference on Mobile computing and networking. ACM (2002). pp. 239-250. https://www.sigmobile.org/mobicom/2002/papers/p50-lumlau.pdf.

Krishnappa et al., "Optimizing the video transcoding workflow in content delivery networks", Proceedings of the 6th ACM Multimedia Systems Conference. ACM (2015). pp. 37-48. https://people.cs.umass.edu/~ramesh/Site/PUBLICATIONS_files/paper.pdf.

United States Patent and Trademark Office, "Non-final Office Action," issued in connection with U.S. Appl. No. 15/845,471, dated Jul. 23, 2019, 22 pages.

United States Patent and Trademark Office, "Final Office Action," issued in connection with U.S. Appl. No. 15/845,471, dated Jan. 17, 2020, 28 pages.

United States Patent and Trademark Office, "Notice of Allowance and Fee(s) Due," issued in connection with U.S. Appl. No. 15/845,471, dated Apr. 29, 2020, 8 pages.

MEDIA TRANSCODING BASED ON PRIORITY OF MEDIA

This application is a continuation of U.S. patent application Ser. No. 15/845,471, filed on Dec. 18, 2017, now U.S. Pat. No. 10,764,396, which is herein incorporated by reference in its entirety.

The present disclosure relates generally to digital media distribution, and relates more particularly to devices, non-transitory computer-readable media, and methods for transcoding digital media in an optimized manner based on media priority.

BACKGROUND

Transcoding of digital media involves the conversion of the digital media from one file format to another, e.g., for the purposes of device support, file size, technology advances, or other reasons. For instance, a digital video file stored in a first format on a server may be converted to a second file format for play on a particular customer device, if the customer device does not support the first file format.

Content delivery networks (CDNs) over which digital media may be distributed may have various resources available for transcoding the digital media. For instance, a party that uses a CDN to distribute content may have access to both finite transcoding resources (e.g., via a data center owned by the operator) and infinite transcoding resources (e.g., via the cloud).

SUMMARY

In one example, the present disclosure describes a device, computer-readable medium, and method for transcoding digital media in an optimized manner based on media priority. For instance, in one example, a method includes obtaining a plurality of media content items awaiting transcoding before being distributed over a content distribution network, identifying a plurality of transcoding resources available to transcode the plurality of media items, and generating a schedule for transcoding the plurality of media content items using the plurality of transcoding resources, wherein the schedule prioritizes those media content items of the plurality of media content items that have the highest relative business value.

In another example, a device includes a processor and a computer-readable medium storing instructions which, when executed by the processor, cause the processor to perform operations. The operations include obtaining a plurality of media content items awaiting transcoding before being distributed over a content distribution network, identifying a plurality of transcoding resources available to transcode the plurality of media items, and generating a schedule for transcoding the plurality of media content items using the plurality of transcoding resources, wherein the schedule prioritizes those media content items of the plurality of media content items that have the highest relative business value.

In another example, a computer-readable medium stores instructions which, when executed by the processor, cause the processor to perform operations. The operations include obtaining a plurality of media content items awaiting transcoding before being distributed over a content distribution network, identifying a plurality of transcoding resources available to transcode the plurality of media items, and generating a schedule for transcoding the plurality of media content items using the plurality of transcoding resources, wherein the schedule prioritizes those media content items of the plurality of media content items that have the highest relative business value.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a means for transcoding digital media in an optimized manner based on media priority. Operators of content distribution networks over which digital media may be distributed may have various resources available for transcoding the digital media. For instance, the operator of a content distribution network may have access to both finite, private transcoding resources (e.g., via a data center owned by the operator) and infinite, public transcoding resources (e.g., via resources leased from third parties via a public cloud). Conventionally, these resources are applied to transcode a set of media content on a first in, first out (FIFO) basis, i.e., the media content is transcoded in the order it is received. However, this approach may fail to maximize the use of private resources, resulting in some private resources going underutilized or idle and/or overutilization of more expensive public resources.

Examples of the present disclosure prioritize a potentially dynamically changing pool of media content for transcoding so that media content is transcoded in order of business value. For instance, media content that is likely to be consumed by a million or more customers may have a higher business value than media content that is likely to be consumed by a few dozen customers. Moreover, the time needed to transcode a media content item is often a multiple of the duration of the media content item (e.g., four to twelve hours may be needed to transcode a one-hour long video file). Thus, it may make more sense, from a business perspective, to perform transcoding of the higher-value media content first, or to allocate more (or more expensive) transcoding resources to the higher-value media content. Examples of the present disclosure may be further extended to optimize encoding for micro services.

In one example, a graph-based representation is constructed to link all incoming demand (e.g., all media content waiting to be transcoded) to all available transcoding resources. A mathematical optimization, such as a maximum flow, cost analysis, may then be applied to the graph-based representation. Machine learning can be used to understand the business value of incoming media content, common transcoding errors that may be encountered, and the costs of using various transcoding resources. This information, in turn, can be used to continuously modify the optimization. Machine learning can also be used to identify trends regarding, for example, transcoding duration time for similar media types, transcoding error rates for similar media types, and the like.

In some examples of the disclosure, if the transcoding error rate is high for a media type associated with a given media content item and the business value of the media content item is also high, multiple paths for the media content item may be transcoded. This may result in duplicate transcoded items, but will increase the likelihood of the high business value media content item is correctly transcoded in a timely manner.

Figure 1:
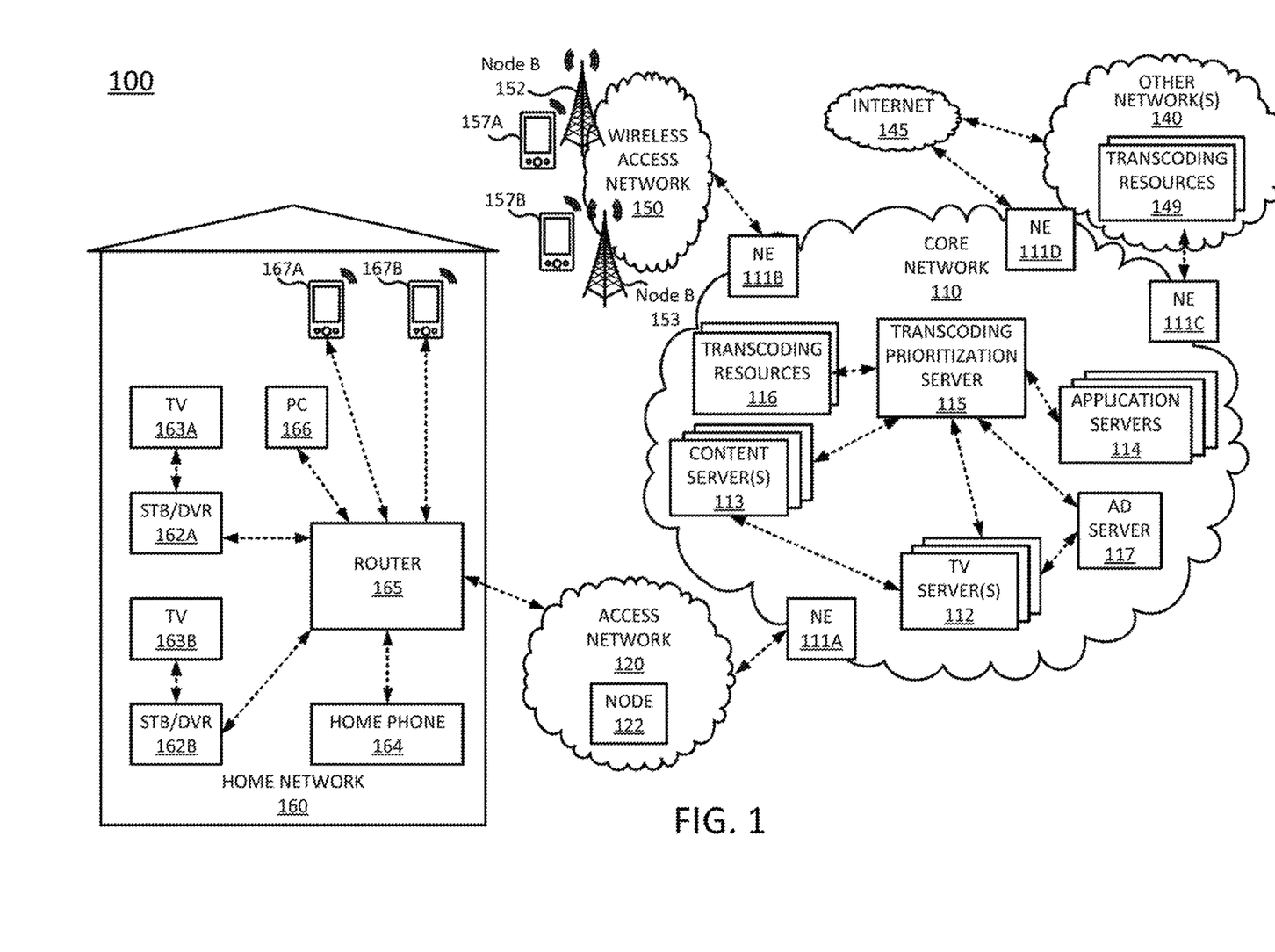
FIG. 1 illustrates an example content distribution network related to the present disclosure.

To better understand the present disclosure, FIG. 1 illustrates an example network 100, related to the present disclosure. As shown in FIG. 1, the network 100 may comprise a content distribution network (e.g., data network) that connects mobile devices 157A, 157B, 167A and 167B, and devices such as set-top boxes (STBs) 162A, and 162B, television (TV) 163A and TV 163B, router 165, personal computer (PC) 166, and so forth, with one another and with various other devices via a core network 110, a wireless access network 150 (e.g., a cellular network), an access network 120, other networks 140 and/or the Internet 145. Mobile devices 157A, 157B, 167A and 167B, and devices such as set-top boxes (STBs) 162A, and 162B, television (TV) 163A and TV 163B, router 165, and personal computer (PC) 166 may also be referred to herein as "customer devices" or "user endpoint devices."

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a global positioning system (GPS), a portable gaming device, a wearable smart device (e.g., a smart watch or a fitness tracker), a satellite radio receiver or satellite television receiver, or any other device having a user interface that is capable of receiving bandwidth from the network 100 in the form of streaming data. In one example, any one or more of mobile devices 157A, 157B, 167A, and 167B may have both cellular and non-cellular access capabilities and may further have wired communication and networking capabilities. Any one or more of mobile devices 157A, 157B, 167A, and 167B may have installed thereon a digital content distribution application that allows the user of the mobile device to access digital multimedia content such as videos, images, audio, web sites, and the like.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, a transcoding prioritization server 115, and a set of transcoding resources 116. For ease of illustration, various additional elements of core network 110 are omitted from FIG. 1.

With respect to television service provider functions, core network 110 may include one or more third party television content (TV) servers 112 for the delivery of television content. In this regard, television servers 112 may interact with content servers 113 and advertising server 117 to select which video programs, or other content and advertisements to provide to the home network 160, to the mobile devices 157A, 157B, 167A, and 167B, and to other downstream viewing locations.

In one example, content servers 113 may store scheduled television content for a number of third party television content providers, video-on-demand programming, local programming content, and so forth. For example, third party television content providers may upload various contents to the core network to be distributed to various subscribers. Alternatively, or in addition, third party television content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

The transcoding prioritization server 115 performs operations, discussed in greater detail below in connection with FIG. 2, related to prioritizing a set of media content for transcoding. The transcoding prioritization server 115 may perform these operations in connection with data regarding available transcoding resources, including the set of transcoding resources 116.

The set of transcoding resources 116 may comprise various computing resources (e.g., a data center) that are available for performing transcoding of a set of media content. In one example, the set of transcoding resources comprises private transcoding resources, e.g., dedicated resources that are owned by the operator of the core network 110. Further transcoding resources 149, e.g., public transcoding resources, may be available to the operator of the core network 110 via connection to other networks 140.

Figure 5:
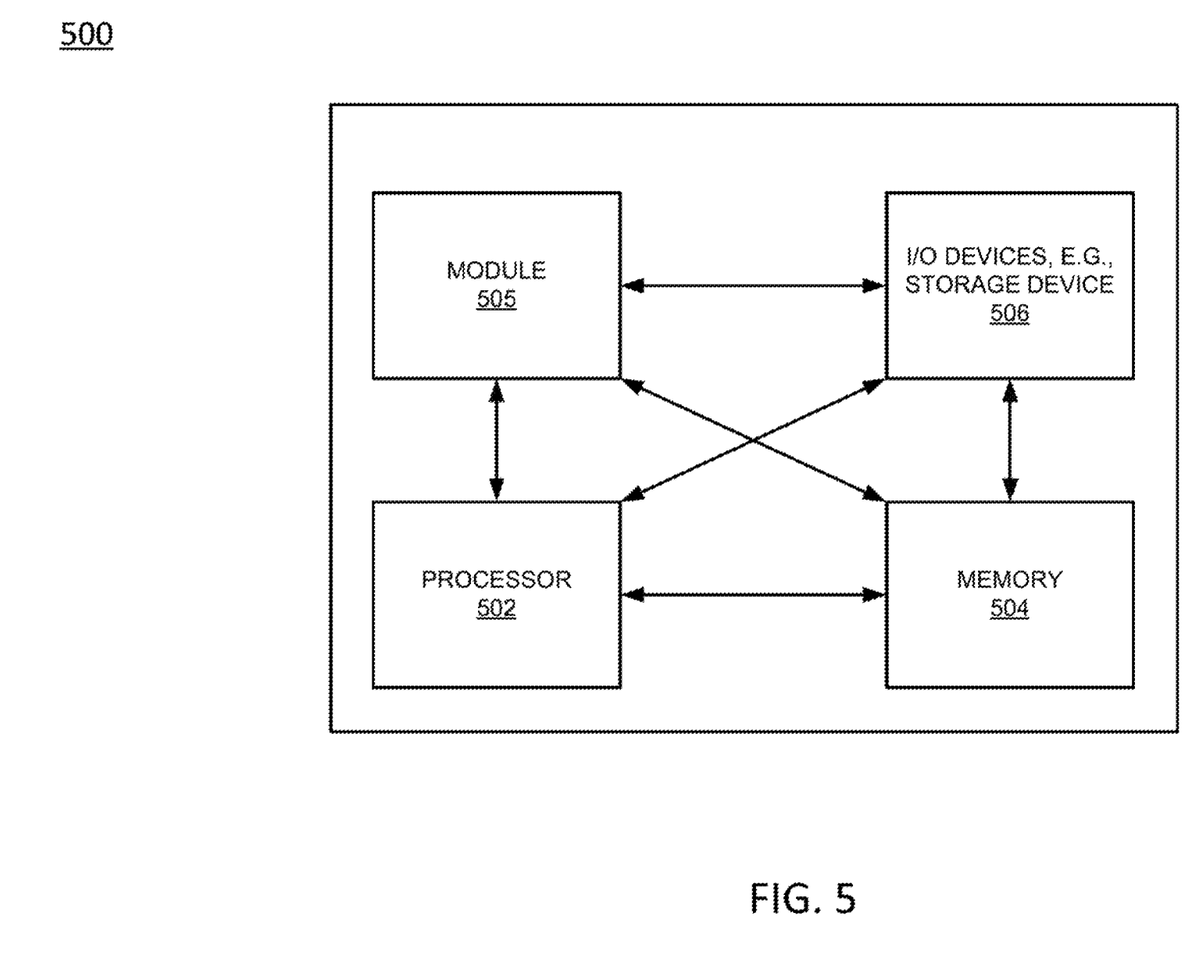
FIG. 5 depicts a high-level block diagram of a computing device specifically programmed to perform the functions described herein.

In one example, any or all of the television servers 112, content servers 113, application servers 114, transcoding prioritization server 115, set of transcoding resources 116, and advertising server 117 may comprise a computing system, such as computing system 300 depicted in FIG. 5.

In one example, the access network 120 may comprise a Digital Subscriber Line (DSL) network, a Local Area Network (LAN), a cellular or wireless access network, a 3$^{rd}$ party network, and the like. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to communications with web servers via the Internet 145 and/or other networks 140, and so forth.

In one example, home network 160 may include a router 165, which receives data/communications associated with different types of media, e.g., television, phone, and Internet, and separates these communications for the appropriate devices. The data/communications may be received via access network 120, for instance. In one example, television data files are forwarded to set-top boxes (STBs)/digital video recorders (DVRs) 162A and 162B to be decoded, recorded, and/or forwarded to television (TV) 163A and TV 163B for presentation. Similarly, Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. Each of these devices may be configured to support media content of particular file formats. In one example, router 165 may further communicate with TV (broadly a display) 163A and/or 163B, e.g., where one or both of the televisions is a smart TV. TVs 163A and/or 163B may also be configured to support media content of particular file formats. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
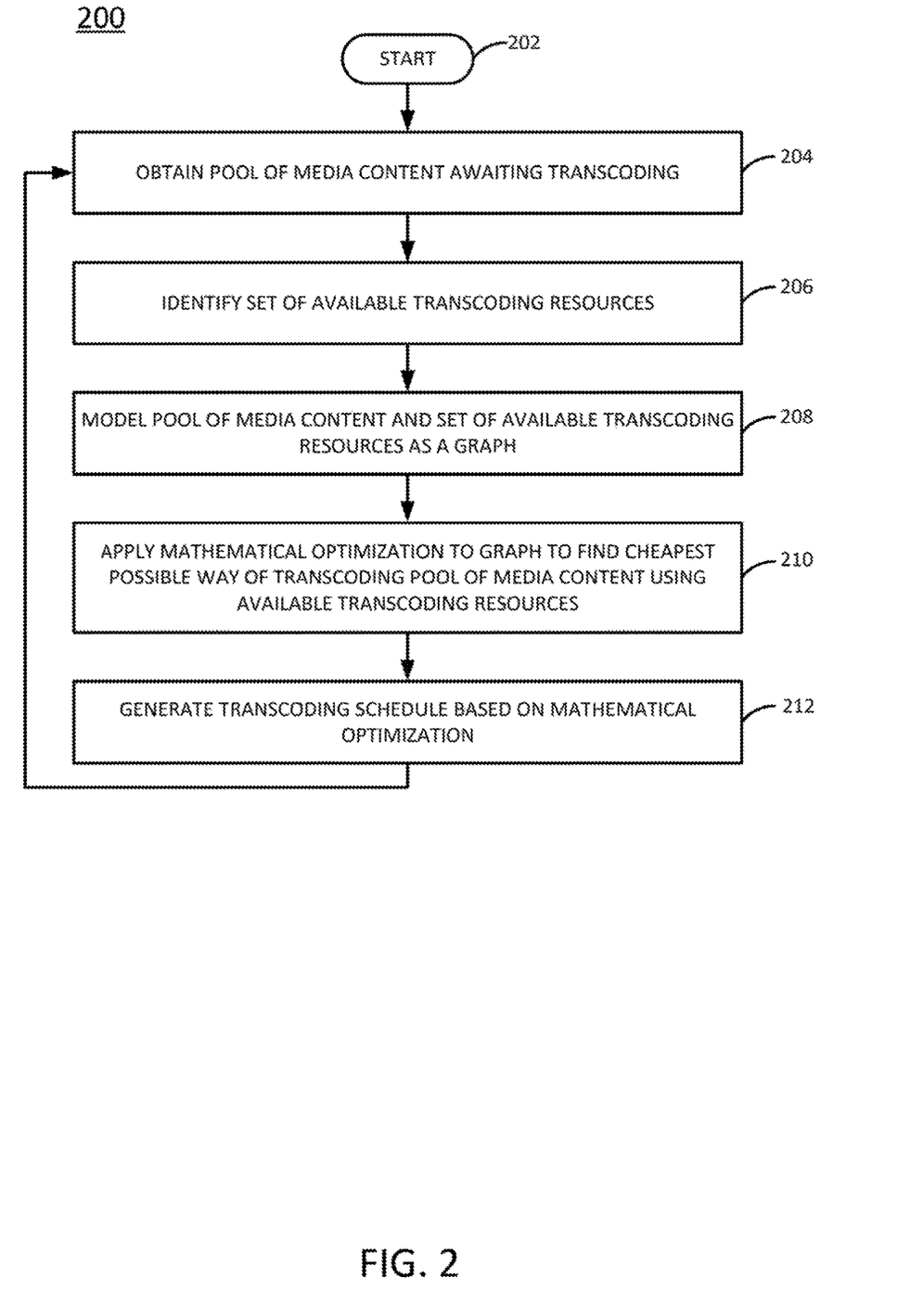
FIG. 2 illustrates a flowchart of an example method for transcoding digital media in an optimized manner based on media priority.

To further aid in understanding the present disclosure, FIG. 2 illustrates a flowchart of an example method 200 for transcoding digital media in an optimized manner based on media priority. In one example, the method 200 may be performed by the transcoding prioritization server 115 and/or additional devices illustrated in FIG. 1. However, in other examples, the method 200 may be performed by another device or devices (e.g., one or more application servers 114 or other device(s)). As such, any references in the discussion of the method 200 to components of FIG. 1 are not intended to limit the means by which the method 200 may be performed.

The method 200 begins in step 202. In step 204, a pool of media content awaiting transcoding is obtained. The pool of media content may comprise, for example, a plurality of media content items such as video, image, audio, or other media obtained from a plurality of sources for distribution over a content distribution network. The current file formats of the individual media content items may be unsupported or non-optimal for the user endpoint devices to which the media content is to be distributed. Thus, the pool of media content represents incoming transcoding demand.

In step 206, a set of available transcoding resources is identified. The available transcoding resources comprise a plurality of transcoding (computing) resources that are currently available for performing transcoding of the pool of media content. The available transcoding resources may include one or both of private transcoding resources (e.g., a data center owned by the operator) and public transcoding resources (e.g., third-party-owned resources that may be leased via a public cloud). Thus, the set of available transcoding resources represents an existing transcoding resource supply. Some of these transcoding resources may be more costly to use than others (e.g., it may be more costly to use public transcoding resources than to use private transcoding resources).

In step 208, the pool of media content and the set of available transcoding resources is modeled as a graph. In one example, the graph comprises a plurality of nodes that are connected in various ways to create a plurality of paths through the graph. Each path represents one possible option for transcoding a media content item.

Figure 3:
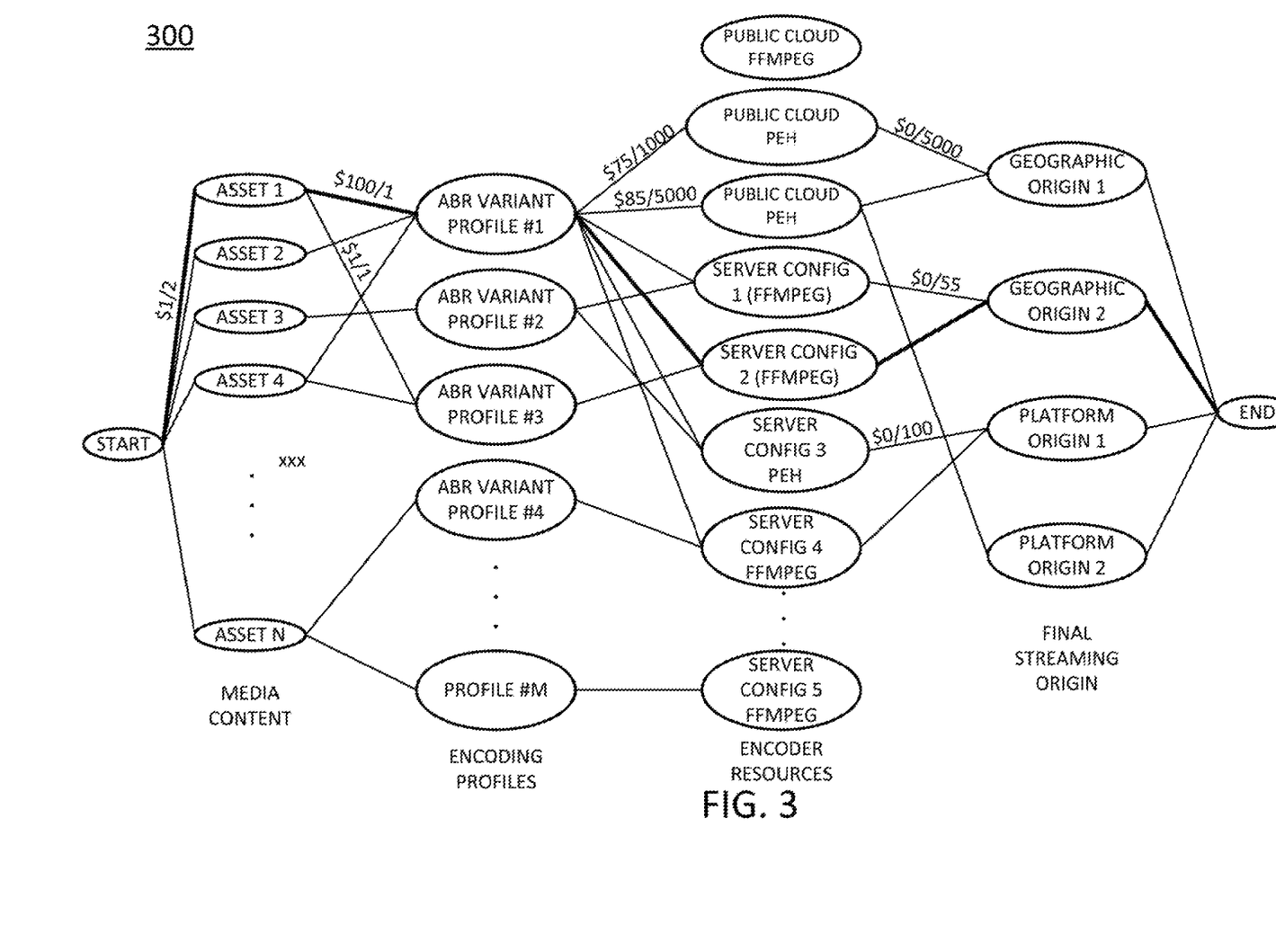
FIG. 3 illustrates an example graph-based model for prioritizing an example pool of media content for transcoding on an example set of available transcoding resources.

FIG. 3, for instance, illustrates an example graph-based model 300 for prioritizing an example pool of media content for transcoding on an example set of available transcoding resources. As illustrated, the graph-based model 300 includes a first plurality of nodes, labeled as Asset 1-Asset N. Each node of the first plurality of nodes represents a different media content item or "asset" to be transcoded. For instance, each node in the first plurality of nodes may represent a video file. In one example, each node in the first plurality of nodes mat represents a mezzanine file (i.e., a digital master file that is used to create copies of video for streaming or download). Each node in the first plurality of nodes may be further associated with a service level agreement (SLA) for output tenants (e.g., telecommunications service(s) over which the media content item is to be distributed, such as the DTV Now or Uverse service).

The graph-based model 300 also includes a second plurality of nodes, labeled as Profile #1-Profile #M. Each node of the second plurality of nodes represents a different encoding profile (or transcoding format) for a different output tenant available for encoding the media content items. Encoding profiles are tightly coupled to encoders. For instance, if the media content items to be transcoded (i.e., the media content items represents by the first plurality of nodes) comprise video files, then the different encoding profiles could represent different average bit rates (ABR) or different average amounts of data transferred per unit of time (e.g., 128 kbit/s, 400 kbits/s, 750 kbit/s, etc.).

The graph-based model 300 also includes a third plurality of nodes, labeled as PUBLIC CLOUD FFMPEG-SERVER CONFIG 5 FFMPEG. Each node in the third plurality of nodes represents a different encoder resource available to transcode the media content items. For instance, each node in the third plurality of nodes may be associated with a different combination of encoder source (e.g., physical or virtual encoder source, such as a public cloud, a particular physical server configuration, etc.) and codec library (e.g., fast forward moving picture experts group (FFMPEG), proprietary encoding hardware (PEH), etc.).

The graph-based model 300 also includes a fourth plurality of nodes, labeled as GEOGRAPHIC ORIGIN 1-PLATFORM 2 ORIGIN. Each node in the fourth plurality of nodes represents a final streaming origin (or "resting location") for a media content item of a given ABR variant or potential non-streaming output (i.e., a service or platform through which the transcoded media content item is to be distributed to customers). For instance, final streaming origins for media content items might include a particular geographic region, a particular video on-demand service, or the like.

Referring back to FIG. 2, in step 210, a mathematical optimization is applied to the graph-based representation in order to find the cheapest possible way of transcoding the pool of media content (e.g., the media content items represented by the first plurality of nodes) using the available transcoding resources (e.g., the encoder resources represented by the third plurality of nodes). In one example, the mathematical optimization is a maximum flow, minimum cost analysis.

For instance, referring back to FIG. 3, in one example, each path through the graph-based model 300, from the start node to the end node, passes through one node in each plurality of nodes. Thus, a single path through the graph-based model 300 represents a possible combination of media content item, transcoding format, encoder, and final streaming origin for the media content item. As also illustrated in FIG. 3, each link in the path (i.e., each connection between two nodes in the path) has two properties: (1) flow (i.e., a number of connections allowed); and (2) cost (i.e., the monetary cost of the connection/selection).

In one example, the graph-based model 300 is optimized for maximum usage (i.e., the maximum number of connections allowed). However, in further examples, since maximum usage tends to be costly relative to even slightly less than maximum usage, the graph-based model 300 can be solved for less than maximum usage. In this case, the cost decreases with the total number of connections made. In a further example still, the number of connections is optimized so that the total number of connections made results in the highest return on the investment made (i.e., on the associated cost). In other examples, the cost can be controlled by limiting the number of allowed connections to public transcoding resources (e.g., to a maximum number of allowed connections per month, for instance).

Figure 4:
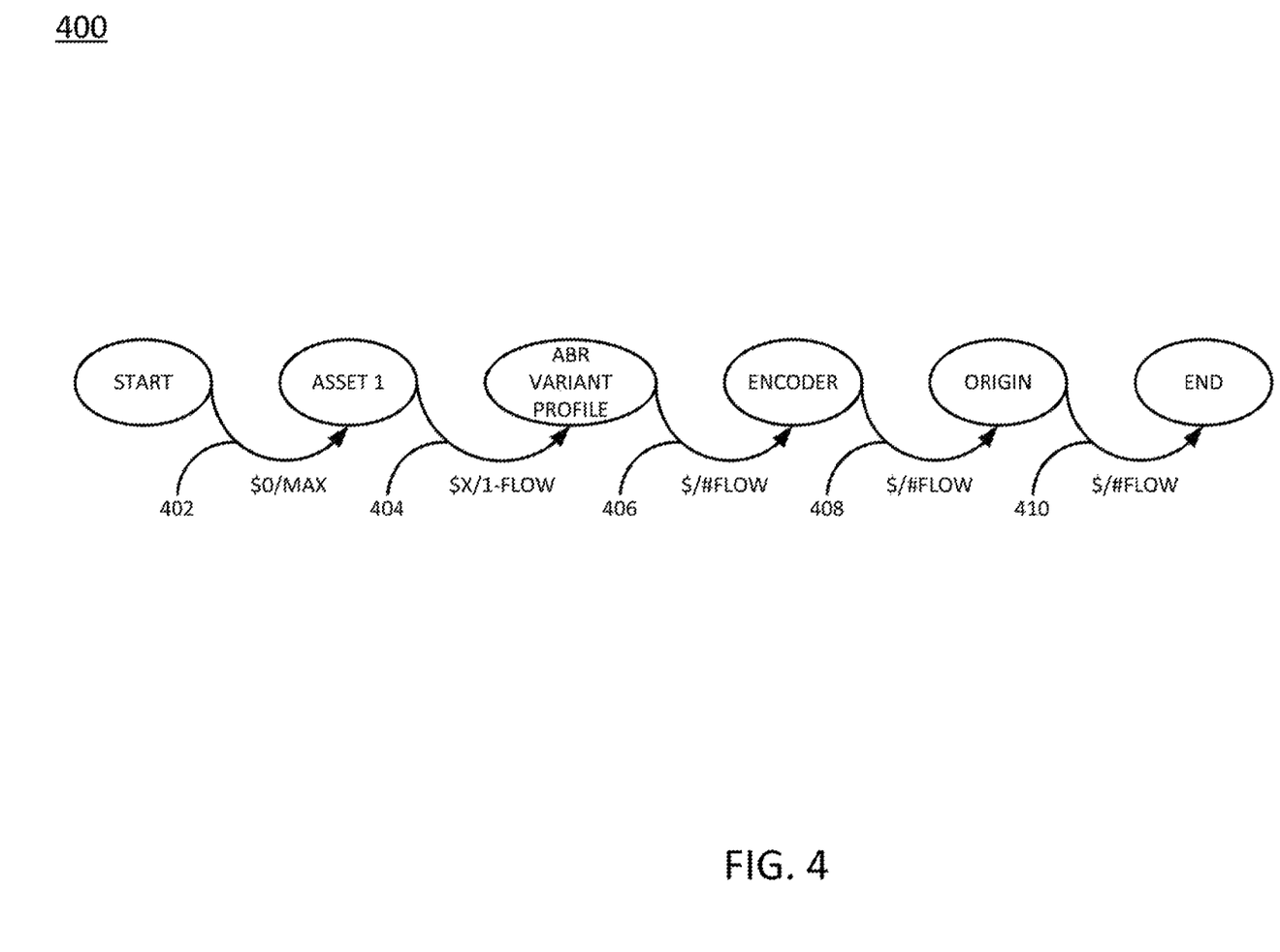
FIG. 4 illustrates how the cost may be calculated for an example path through the graph-based model of FIG. 3.

FIG. 4 illustrates how the cost may be calculated for an example path 400 through the graph-based model 300 of FIG. 3. As discussed above, each link or connection in the path is associated with a flow (i.e., a number of connections allowed) and a cost (i.e., the monetary cost of the connection/selection).

As illustrated, the connection 402 from the start node to a node representing a media content item may be associated with zero cost. In the case of this connection, the total flow considers all of the ABR variants that may be required (e.g., in accordance with device configuration rules/rights management systems).

A connection 404 from a node representing a media content item to a node representing an encoding profile is made based on what ABR profiles need to be created. In this case, the cost is modeled on SLA (risk); the lower the risk, the higher the priority. The flow is fixed at one.

A connection 406 from a node representing an encoding profile and a node representing an encoder may be made when the connected encoder can produce the connected encoding profile. In this case, the cost is modeled on the computing cost per unit of time (e.g., per hour) and the time to create the ABR variant). The flow is based on the maximum number of encoders available, or the remaining available operating expense for public encoding resources.

A connection 408 from a node representing an encoder and a node representing a final streaming origin may be made when the connected encoder can produce the profile for the connected final streaming origin. In this case, the cost is modeled on the computing cost per unit of time (e.g., per hour) and the time to create the ABR variant). The flow is based on the maximum number of encoders available, or the remaining available operating expense for public encoding resources. The flow is based on the maximum number of encoders available, or the remaining available operating expense for public encoding resources.

The flow associated with a connection 410 from a node representing a final streaming origin to the end node may be based on the total remaining capacity at the final streaming origin.

It should be noted that the example graph-based model 300 is a simplified representation. For instance, the graph-based model could be expanded with additional groups of nodes to represent the transcoding and media pipeline in greater detail. Resources could then be allocated to media content based on sub-steps of the transcoding process (e.g., audio normalization, video quality control, etc.). This allows the priority of the transcoding to be shifted based on holistic business service-level agreements (SLAs) and cost versus a conventional FIFO model.

In one example, machine learning is employed to perform the mathematical optimization. Machine learning may account for information such as the relative business value of the individual media content items (e.g., which media content items have higher business value, which may be based on genre, availability, scheduled air date, etc.), how long it takes to transcode certain types of media content items, the error rates associated with transcoding media content items of certain types or from certain sources, and other factors.

Referring back to FIG. 2, in step 212, a transcoding schedule is generated based on the mathematical optimization. That is, the individual media content items in the pool of media content are scheduled for transcoding into the necessary ABR variants on the available encoding resources. As discussed above, the schedule may prioritize media content items having higher business value (e.g., media content items that are likely to be consumed by a greater number of customers). The relative priority of a given media content item may change with time. For instance, a video file of a television program scheduled to air in three weeks' time may not be considered a high priority, but as the air date draws closer, the priority of that video file may increase.

The method 200 then returns to step 204. The pool of media content may change over time, e.g., as individual media content items are transcoded, new media content items are added to the pool, and the like. Moreover, information learned through previous iterations of the method 200 (e.g., information regarding prioritization, cost, the number of connections that can be afforded, encoding errors rates, etc.) can be used to improve the optimization process during subsequent iterations.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 5 depicts a high-level block diagram of a computing device specifically programmed to perform the functions described herein. For example, any one or more components or devices illustrated in FIG. 1 or described in connection with the method 200 may be implemented as the system 500. For instance, an application server (such as might be used to perform the method 200) could be implemented as illustrated in FIG. 5.

As depicted in FIG. 5, the system 500 comprises a hardware processor element 502, a memory 504, a module 505 for transcoding digital media in an optimized manner, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for transcoding digital media in an optimized manner may include circuitry and/or logic for performing special purpose functions relating to modeling a pool of media content and available transcoding resources and to optimization allocation of the available transcoding resources among the pool of media content. The input/output devices 506 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for transcoding digital media in an optimized manner (e.g., a software program comprising computer-executable instructions) can be loaded into memory 504 and executed by hardware processor element 502 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for transcoding digital media in an optimized manner (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, by a processing system including at least one processor, a plurality of media content items awaiting transcoding before being distributed over a content distribution network;
identifying, by the processing system, a plurality of transcoding resources available to transcode the plurality of media content items;
constructing, by the processing system, a graph-based representation of the plurality of media content items and the plurality of transcoding resources;
generating, by the processing system, a plurality of paths through the graph-based representation, wherein each path of the plurality of paths represents a possible combination of: one media content item of the plurality of media content items, one transcoding resource of the plurality of transcoding resources, and one transcoding format of a plurality of transcoding formats;
calculating, by the processing system, a plurality of costs, wherein each cost of the plurality of costs is associated with one path of the plurality of paths; and
generating, by the processing system and based at least in part on the plurality of costs, a schedule for transcoding the plurality of media content items using the plurality of transcoding resources, wherein each media content item of the plurality of media content items has a business value, wherein the schedule prioritizes those media content items of the plurality of media content items that have a higher relative business value as compared to other media content items of the plurality of media content items.

2. The method of claim 1, wherein the plurality of transcoding resources includes at least one private transcoding resource owned by an operator of the content distribution network and at least one public transcoding resource leased from a third party via a public cloud.

3. The method of claim 1, wherein the generating comprises:
applying, by the processing system, a mathematical optimization to the graph-based representation to identify a cheapest possible way of transcoding the plurality of media content items.

4. The method of claim 3, wherein the graph-based representation comprises:
a first plurality of nodes, wherein each node in the first plurality of nodes represents a different media content item of the plurality of media content items;
a second plurality of nodes, wherein each node in the second plurality of nodes represents a different encoding profile of a plurality of encoding profiles;
a third plurality of nodes, wherein each node in the third plurality of nodes represents a different transcoding resource of the plurality of transcoding resources; and
a fourth plurality of nodes, wherein each node of the fourth plurality of nodes represents a different final streaming origin of a plurality of final streaming origins for the plurality of media content items.

5. The method of claim 4, wherein each path of the plurality of paths comprises a plurality of links connecting nodes of the first plurality of nodes, the second plurality of nodes, the third plurality of nodes, and the fourth plurality of nodes.

6. The method of claim 5, wherein the mathematical optimization maximizes a number of the plurality of links.

7. The method of claim 5, wherein the mathematical optimization limits a number of links that is made to public transcoding resources in the plurality of transcoding resources.

8. The method of claim 5, wherein the mathematical optimization optimizes a number of links to result in a highest return on a cost associated with the number of links.

9. The method of claim 5, wherein the plurality of links comprises:
a first link connecting a start node to a first node of the first plurality of nodes;
a second link connecting the first node to a second node of the second plurality of nodes;
a third link connecting the second node to a third node of the third plurality of nodes;
a fourth link connecting the third node to a fourth node of the fourth plurality of nodes; and
a fifth link connecting the fourth node to an end node.

10. The method of claim 9, wherein each link of the plurality of links is associated with a flow representing a number of allowed connections and a cost representing a monetary cost of the link.

11. The method of claim 10, wherein the first link is associated with a cost of zero, and a flow that considers all variants on the plurality of encoding profiles.

12. The method of claim 10, wherein the second link is associated with a cost modeled on a service-level agreement, and a flow that is fixed at one.

13. The method of claim 10, wherein the third link is associated with a cost of computing cost per unit of time and an amount of time to create a variant of an encoding profile associated with the third node, and a flow that is based on a maximum number of available transcoding resources of the plurality of transcoding resources.

14. The method of claim 10, wherein the fourth link is associated with a cost of computing cost per unit of time and an amount of time to create a variant of an encoding profile associated with the third node, and a flow that is based on a maximum number of available transcoding resources of the plurality of transcoding resources.

15. The method of claim 10, wherein the fifth link is associated with a flow that is based on a total remaining capacity at the final streaming origin of the plurality of final streaming origins that is represented by the fourth node.

16. The method of claim 3, wherein the mathematical optimization is a minimum cost, maximum flow analysis.

17. The method of claim 3, wherein the mathematical optimization learns based on previous iterations of the obtaining, the identifying, and the generating.

18. The method of claim 17, wherein information learned based on the previous iterations includes an error rate encountered when transcoding media content items from certain sources.

19. A device comprising:
a processor; and a non-transitory computer-readable medium storing instructions which, when executed by the processor, cause the processor to perform operations, the operations comprising:
   obtaining a plurality of media content items awaiting transcoding before being distributed over a content distribution network;
   identifying a plurality of transcoding resources available to transcode the plurality of media content items; and
   constructing a graph-based representation of the plurality of media content items and the plurality of transcoding resources;
   generating a plurality of paths through the graph-based representation, wherein each path of the plurality of paths represents a possible combination of: one media content item of the plurality of media content items, one transcoding resource of the plurality of transcoding resources, and one transcoding format of a plurality of transcoding formats;
   calculating a plurality of costs, wherein each cost of the plurality of costs is associated with one path of the plurality of paths; and
   generating, based at least in part on the plurality of costs, a schedule for transcoding the plurality of media content items using the plurality of transcoding resources, wherein each media content item of the plurality of media content items has a business value, wherein the schedule prioritizes those media content items of the plurality of media content items that have a higher relative business value as compared to other media content items of the plurality of media content items.

20. A non-transitory computer-readable medium storing instructions which, when executed by a processor, cause the processor to perform operations, the operations comprising:
   obtaining a plurality of media content items awaiting transcoding before being distributed over a content distribution network;
   identifying a plurality of transcoding resources available to transcode the plurality of media content items; and
   constructing a graph-based representation of the plurality of media content items and the plurality of transcoding resources;
   generating a plurality of paths through the graph-based representation, wherein each path of the plurality of paths represents a possible combination of: one media content item of the plurality of media content items, one transcoding resource of the plurality of transcoding resources, and one transcoding format of a plurality of transcoding formats;
   calculating a plurality of costs, wherein each cost of the plurality of costs is associated with one path of the plurality of paths; and
   generating, based at least in part on the plurality of costs, a schedule for transcoding the plurality of media content items using the plurality of transcoding resources, wherein each media content item of the plurality of media content items has a business value, wherein the schedule prioritizes those media content items of the plurality of media content items that have a higher relative business value as compared to other media content items of the plurality of media content items.

* * * * *